(12) United States Patent
Jha et al.

(10) Patent No.: US 9,945,527 B2
(45) Date of Patent: Apr. 17, 2018

(54) LED LIGHT UNIT AND METHOD OF REPLACING AN LED LIGHT UNIT

(71) Applicant: Goodrich Lighting Systems GmbH, Lippstadt (DE)

(72) Inventors: Anil Kumar Jha, Lippstadt (DE); Christian Schoen, Mainz (DE); Andre Hessling von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 14/250,837

(22) Filed: Apr. 11, 2014

(65) Prior Publication Data

US 2014/0334175 A1  Nov. 13, 2014

(30) Foreign Application Priority Data

May 7, 2013 (EP) .................................. 13166846

(51) Int. Cl.
| | |
|---|---|
| *F21S 8/10* | (2006.01) |
| *F21V 19/00* | (2006.01) |
| *B64D 47/06* | (2006.01) |
| *B64D 33/02* | (2006.01) |
| *F21Y 115/10* | (2016.01) |

(52) U.S. Cl.
CPC ......... *F21S 48/1225* (2013.01); *F21S 48/115* (2013.01); *F21S 48/215* (2013.01); *F21S 48/2212* (2013.01); *F21V 19/003* (2013.01); *B64D 47/06* (2013.01); *B64D 2033/0233* (2013.01); *F21Y 2115/10* (2016.08); *Y10T 29/49117* (2015.01)

(58) Field of Classification Search
CPC .. F21S 48/1225; F21S 48/215; F21S 48/2212; B64D 47/02; B64D 2203/00
USPC ........................................................ 362/520
See application file for complete search history.

(56) References Cited

U.S. PATENT DOCUMENTS

| | | | |
|---|---|---|---|
| 6,908,219 B1 | 6/2005 | Reiss | |
| 8,545,049 B2 * | 10/2013 | Davis et al. | ................... 362/244 |
| 2005/0017259 A1 | 1/2005 | Han | |

(Continued)

FOREIGN PATENT DOCUMENTS

EP  1916470 A2  4/2008

OTHER PUBLICATIONS

European Search Report for Application No. 13166846.9-1756. dated Nov. 15, 2013. 5 pages.

(Continued)

*Primary Examiner* — Alexander Garlen
*Assistant Examiner* — Eric T Eide
(74) *Attorney, Agent, or Firm* — Cantor Colburn LLP

(57) ABSTRACT

An LED light unit, in particular for a passenger transportation vehicle, such as an aircraft, a road vehicle, a ship or a rail car, has a support portion a light source having at least one LED, the light source being arranged on the support portion, and a refractive optical element having an inner surface and an outer surface the refractive optical element being attached to the support portion and being arranged over the light source. The refractive optical element has a chamfer portion adjacent the support portion, wherein at least one of the inner surface and the outer surface has at least one chamfer surface in the chamfer portion.

11 Claims, 5 Drawing Sheets

(56) References Cited

U.S. PATENT DOCUMENTS

| | | | |
|---|---|---|---|
| 2006/0034082 A1* | 2/2006 | Park | H01L 33/58 |
| | | | 362/268 |
| 2006/0083002 A1 | 4/2006 | Koike et al. | |
| 2008/0094852 A1* | 4/2008 | King et al. | 362/516 |
| 2008/0100773 A1* | 5/2008 | Hwang | G02B 3/005 |
| | | | 349/62 |
| 2009/0067180 A1 | 3/2009 | Tahmosybayat | |
| 2010/0033970 A1 | 2/2010 | Jetter et al. | |
| 2010/0076615 A1* | 3/2010 | Daniel et al. | 700/293 |
| 2010/0172135 A1* | 7/2010 | Holder et al. | 362/249.14 |
| 2010/0238669 A1* | 9/2010 | Holder et al. | 362/311.02 |
| 2011/0122635 A1 | 5/2011 | Calvin et al. | |
| 2011/0320024 A1 | 12/2011 | Lin et al. | |
| 2012/0140498 A1* | 6/2012 | Fabbri | B64D 47/04 |
| | | | 362/470 |
| 2014/0104853 A1 | 4/2014 | Lin et al. | |
| 2014/0334174 A1 | 11/2014 | Jha et al. | |
| 2015/0192256 A1 | 7/2015 | Hyun et al. | |

OTHER PUBLICATIONS

European Search Report for Application No. 13166850.-1756 dated Nov. 15, 2013.

* cited by examiner

LED LIGHT UNIT AND METHOD OF REPLACING AN LED LIGHT UNIT

CROSS REFERENCE TO RELATED APPLICATION

This application claims priority to European Patent Application No. 13 166 846.9 filed May 7, 2013, the entire contents of which is incorporated herein by reference.

TECHNICAL FIELD

The invention relates to exterior lighting systems for passenger transport vehicles, such as aircraft, road vehicles, ships or rail cars. In particular, it relates to an LED light unit for such passenger transport vehicles.

BACKGROUND

Almost all passenger transport vehicles have exterior lights. They are provided for a wide variety of different purposes, such as for allowing the passengers and/or operators to view the outside, for passive visibility, for signalling purposes, etc. In the aircraft industry and other fields, exterior lights are highly regulated in terms of the light intensity distributions that are emitted from the lights.

LED light units have become common in the aircraft industry in recent years. In order to satisfy the regulations, complex optical structures have been developed that comprise various LED's, reflectors and shutters. These complex structures lead to LED light units that are complicated to manufacture and are fairly costly.

Accordingly, it would be beneficial to provide an LED light unit that has improved means for conditioning the output light intensity distribution. Further, it would be beneficial to provide a method of replacing existing LED light units, for example when they are used for a long time or broken, with such improved LED light units, while keeping the wiring of the power supply systems.

SUMMARY

Exemplary embodiments of the invention include an LED light unit, in particular for a passenger transportation vehicle, such as an aircraft, a road vehicle, a ship or a rail car, comprising a support portion, a light source having at least one LED, the light source being arranged on the support portion, and a refractive optical element having an inner surface and an outer surface, the refractive optical element being attached to the support portion and being arranged over the light source. The refractive optical element has a chamfer portion adjacent the support portion, wherein at least one of the inner surface and the outer surface has at least one chamfer surface in the chamfer portion.

A chamfer surface is generally a surface inclined with respect to the remainder of the refractive optical element. Providing such a chamfer surface, or a plurality of chamfer surfaces, allows for refracting the light from the light source in the chamfer portion in a different manner as compared to the remainder of the refractive optical element. In this way, the chamfer portion of the LED light unit alters the output light intensity distribution in a manner different from the remainder of the refractive optical element. Providing at least one chamfer surface is an effective means of conditioning the output light intensity distribution without shutters and reflectors inside of the refractive optical element. The at least one chamfer surface is inherently integrated with the remainder of the refractive optical element, which refractive optical element can even be produced in one production step, e.g. by injection molding. With the chamfer portion being positioned adjacent the support portion, the improved way of conditioning the output light intensity may in particular relate to an ambient light emission direction, which often is subject to particularly strict light distribution requirements. These requirements can be satisfied in an improved manner by the provision of the at least one chamfer surface.

The chamfer surface may have an inclination with respect to the remainder of the refractive optical element. As the refractive optical element may have a plurality of shapes, the inclined nature of the chamfer surface may also be defined in other ways. For example, a chamfer surface may be a surface that is not orthogonal to the support portion. In prior art embodiments, the inner surface and the outer surface of the refractive optical element form a substantially 90° angle with the support portion at the border between the refractive optical element and the support portion. In other words, the inner surface and the outer surface of prior art refractive optical elements are orthogonal to the support portion, where those elements meet. The term chamfer surface describes a structure that does not provide such an orthogonal relation with the support portion. The chamfer surface forms an angle other than 90° with the support portion.

The chamfer surface may also be referred to as inclined surface, bevelled surface or slanted surface.

Depending on the high-level structure of the refractive optical element, the chamfer surface may have different forms. For example, if the refractive optical element has an overall substantially rectangular cuboid shape, i.e. a box shape, the chamfer surface may be a plane surface. In another example, if the refractive optical element has an overall substantially spherical shape, the chamfer surface may be an annular section of a cone. In both of these examples, the chamfer surface appears as a straight line in a cross section through the refractive optical element. Consequently, according to a particular embodiment, the chamfer surface may form a straight line in a cross section through the refractive optical element, when the cross-sectional plane is orthogonal to the support portion.

The chamfer surface may form a bend with respect to the remainder of the refractive optical element. This bend may be present in a cross-section through the refractive optical element. It may also extend along the entire chamfer surface. In mathematical terms, the bend may also be characterized as a non-differentiable portion of the inner surface/outer surface. However, the bend may also be smooth, such that it is apparent on a large scale, although the inner surface/outer surface is differentiable in all points.

The expression that "at least one of the inner surface and the outer surface has at least one chamfer surface in the chamfer portion" may include all of the following options. In particular, the inner surface may have exactly one chamfer surface. Alternatively or in addition, the outer surface may have exactly one chamfer surface. It is also possible that one or both of the inner surface and outer surface have a plurality of chamfer surfaces. A plurality of chamfer surfaces may for example be provided if the refractive optical element is not spherical, but cuboid. In that case, each side face may have its own chamfer surface(s), on the inside and/or the outside. It is also possible to have multiple chamfer surfaces on one or both of the inside and the outside of a generally spherical refractive optical element. This may for example be the case if different output light distributions are desired for different output directions.

The LED light unit may be suitable for the exterior of a passenger transport vehicle, such as an aircraft, a road vehicle, a ship or a rail car.

According to a further embodiment, the at least one chamfer surface extends around the entire perimeter of the refractive optical element. In particular, the inner surface of the refractive optical element may have one or more chamfer surface(s) that extend(s) around the entire perimeter of the refractive optical element. Alternatively/additionally, the outer surface of the refractive optical element may have one or more chamfer surface(s) that extend(s) around the entire perimeter. In this way, the chamfer surface(s) may form an annular surface or a frame-like surface or any other enclosed surface structure, comprised of one or more chamfer surface(s). However, it is also possible that the chamfer surface(s) extend(s) around a portion of the perimeter, on the inside and/or on the outside. The combination is also possible. The at least one chamfer surface may extend around the entire perimeter of the inner surface or the outer surface and extend around a portion of the respectively other one of the inner and outer surfaces.

According to a further embodiment, the chamfer portion extends at most in the lower 50% of the refractive optical element, in particular at most in the lower 40% of the refractive optical element. The terms lower 50% and lower 40% refer to the portion of the height of the refractive optical element where the one or more chamfer surfaces are. In this context, reference is made to the "height" of the refractive optical element and to the "lower" portion of the refractive optical element under the assumption that the refractive optical element is placed on a plane ground surface. The height is measured in the direction of extension orthogonal to the support portion. Accordingly, the "lower" portion of the refractive optical element is the portion adjacent to the support portion. The expressions at most 50% and at most 40% mean 50% or less and 40% or less, respectively.

The extension of the chamfer portion may be defined in various ways. Besides measuring the extension as a portion of the height of the refractive optical element, it is also possible to provide an angular measure. The emitting direction of the light source orthogonal to the support portion is generally the emission direction with the highest light intensity. This orthogonal direction is therefore also referred to as principal light emission direction. In a cross section through the refractive optical element, all points of the inner surface and of the outer surface can be defined by their angles with respect to the principal light emission direction. Accordingly, the extension of the chamfer portion may also be defined by its angular range with respect to the principal light emission direction.

According to a particular embodiment, the chamfer portion extends in an angular range between 60° and 90° with respect to the principal light emission direction. In a further particular embodiment, the chamfer portion extends in an angular range between 70° and 90° with respect to the principal light emission direction. The given angular ranges may be present in a plurality of cross sections through the refractive optical element or in all cross sections.

For some shapes of the refractive optical element, the different extension definitions may be converted easily. For example, for a generally spherical refractive optical element, the portion of the height of the refractive optical element is the cosine of the lower boundary value of the angular range. As a concrete example, a chamfer portion extending in an angular range between 70° and 90° with respect to the principal light emission direction extends in the lower 34.2% of the refractive optical element.

The definition of the extension of the chamfer portion does not require that the defined portion of the refractive optical element is covered entirely with one or more chamfer surfaces. It rather means that no chamfer surface(s) is/are present outside the chamfer portion.

According to a further embodiment, the refractive optical element has at least one of the following four features. First, the inner surface of the refractive optical element may have an inwards slanted chamfer surface refracting the light of the light source towards the support portion. Second, the inner surface of the refractive optical element may have an outwards slanted chamfer surface refracting the light of the light source away from the support portion. Third, the outer surface of the refractive optical element may have an inwards slanted chamfer surface refracting the light of the light source towards the support portion. Fourth, the outer surface of the refractive optical element may have an outwards slanted chamfer surface refracting the light of the light source away from the support portion.

All of these four options of chamfer surfaces allow for an efficient reduction of the output light intensity of the LED light unit in an ambient light emission direction. The term ambient light emission direction refers to a light emission direction far removed from the principal light emission direction. In other words, the ambient light emission direction forms a large angle with the principal light emission direction. In particular embodiments, the ambient light emission direction may denote an angular range of more than 60° with the principal light emission direction, in particular of more than 70° with the principal light emission direction.

The four options described allow for an efficient reduction of the output light intensity of the LED light unit in the ambient light emission direction in the following ways. The inwards slanted chamfer surface on the inner surface of the refractive optical element refracts the light, emitted from the light source, towards the support portion. It may be absorbed by the support portion or by the structure outside the LED light unit, to which the LED light unit is attached, depending on the degree of inclination of the inwards slanted chamfer surface. In either case, this portion of the light from the light source does not contribute to the output light intensity in the ambient light emission direction. Alternatively, the refracted light may be reflected by the support portion or by the structure outside the LED light unit. In this case, depending again on the inclination of the inwards slanted chamfer surface, the refracted light may be reflected in such a way that it does not or only partly contribute to the light emitted in the ambient light emission direction.

The outwards slanted chamfer surface on the inner surface of the refractive optical element refracts the light away from the support portion. In this way, it does not or to a lesser degree contribute to the light emitted in the ambient light emission direction.

The inwards slanted chamfer surface on the outer surface of the refractive optical element refracts the light of the light source towards the support portion. In this way, this light may hit the support portion or the structure outside the LED light unit, to which the LED light unit is attached. The light may be absorbed there, in which case it does not contribute to the light emitted in the ambient light emission direction. Alternatively, the light may be reflected there, in which case it does not or to a lesser degree contribute to the light emitted in the ambient light emission direction, depending on the angle at which the light hits the support portion or the structure outside the LED light unit.

The outwards slanted chamfer surface on the outer surface of the refractive optical element refracts the light of the light source away from the support portion. In this way, it does not or to a lesser degree contribute to the light emitted in the ambient light emission direction.

It is apparent that the amount of contribution to the light emitted in the ambient light emission direction depends on the angular range viewed as the ambient light emission direction and the degree of inclination of the respective chamfer surface.

According to a particular embodiment, exactly one or an arbitrary subset of the inwards slanted chamfer surface on the inner surface, of the outwards slanted chamfer surface on the inner surface, of the inwards slanted chamfer surface on the outer surface, and of the outwards slanted chamfer surface on the outer surface may be present. All of these chamfer surfaces may be present partially or entirely around the perimeter of the inner surface and/or outer surface. In a particular embodiment, one inwards or outwards slanted chamfer surface may be present on each of the inner surface and the outer surface of the refractive optical element.

According to a further embodiment, the inwards slanted chamfer surface of the inner surface of the refractive optical element has such an inclination that it refracts the light from the light source to a border surface between the refractive optical element and the support portion. In this way, the absorption/reflection action of the refracted light takes place within the LED light unit. Accordingly, the LED light unit has a set output light intensity behavior, no matter if it is mounted on an absorptive or reflective structure for operation. It is also possible that the inwards slanted chamfer surface of the inner surface of the refractive element has such an inclination that the refracted light hits the support portion on the outside, but close to the refractive optical element. In this way, a support portion having a slightly larger extension than the lower portion of the refractive optical element leads to an equally set output light intensity behavior, as discussed above.

According to a further embodiment, the support portion is light-absorbent, at least in a border surface between the refractive optical element and the support portion. The material of the support portion may be light absorbent. Alternatively, the support portion may have a light-absorbent coating. The term light-absorbent may refer to the property of absorbing a substantial amount of light irradiated onto the support portion. In particular, it may denote an absorption of 90% or more of the irradiated light.

According to a further embodiment, the support portion is reflective, at least in a border surface between the refractive optical element and the support portion. The material of the support portion may be reflective. Alternatively, the support portion may have a reflective coating.

According to a further embodiment, the light source has a source-side light intensity distribution, emitted from the light source in operation, and the LED light unit has a desired light intensity distribution, emitted from the LED light unit in operation, wherein the at least one chamfer surface is designed in such a way that a relative light intensity of the desired light intensity distribution in an ambient light emission direction is reduced as compared to a relative light intensity of the source-side light intensity distribution in the ambient light emission direction. The refractive optical element, comprising the at least one chamfer surface, carries out a transformation of the light intensity distribution of the light source into an output light intensity distribution with different characteristics. In particular, the refractive optical element may be shaped to transform the source-side light intensity distribution into the desired light intensity distribution. By reducing the light intensity in the ambient light emission direction, the LED light unit is able to satisfy light intensity distribution requirements that require lower relative light intensities in the ambient light emission direction than common light sources provide.

The term relative light intensity refers to the light intensity in a given emission direction with respect to the light intensity in the principal light emission direction or with respect to the total light intensity of the light source. Above described alteration of the relative light intensity distribution may be achieved with one or more chamfer surfaces on the inner surface or with one or more chamfer surfaces on the outer surface or with chamfer surfaces on the inner surface and the outer surface of the refractive optical element.

According to a further embodiment, the at least one chamfer surface is designed in such a way that substantially no light is emitted in the ambient light emission direction. In this way, the LED light unit may satisfy very restrictive regulations regarding the light emission in the ambient light emission direction. Such restrictive regulations may for example be encountered in the aviation regulations for commercial air planes.

According to a further embodiment, the ambient light emission direction is an angular region of between 60° and 90°, in particular between 70° and 90°, with respect to a principal light emission direction of the LED light unit. As explained above, the principal light emission direction is generally the emission direction orthogonal to the support portion and running through the center of the light source.

According to a further embodiment, the desired light intensity distribution is defined by at least two cross-sectional light intensity distributions, the at least two cross-sectional light intensity distributions comprising a first desired cross-sectional light intensity distribution in a first cross-sectional plane and a second desired cross-sectional light intensity distribution in a second cross-sectional plane. The inner surface and the outer surface of the refractive optical element are shaped such that they jointly transform the source-side light intensity distribution into the desired light intensity distribution. In a particular embodiment, at least one of the inner surface and the outer surface of the refractive optical element is not spherical. In this way, the conditioning of the output light intensity may be extended from the chamfer portion of the refractive optical element to a larger portion of or even the entire refractive optical element. However, this does not mean that the at least one chamfer surface cannot provide for the transformation into the desired light intensity distribution by itself. This depends on the desired light intensity distribution in question. Having two specific cross-sectional desired light intensity distributions provides for efficient means of an extensive conditioning of the output light intensity distribution.

The desired light intensity distribution may be a light intensity distribution that satisfies given light intensity requirements. In other words, a desired light intensity distribution fulfils or exceeds given light intensity requirements. With light intensity regulations often requiring two light intensity distributions in particular cross-sectional planes, the definition of the desired light intensity distribution by at least two cross-sectional light intensity distributions allows for an effective adaptation of the LED light unit to the given requirements.

With the refractive optical element having a shape that provides for a transformation of the source-side light intensity distribution into the desired light intensity distribution, the refractive optical element ensures that the emitted light complies with the given light intensity requirements. In this way, the need for additional optical elements between the light source and the refractive optical element may be decreased or entirely eliminated. Moreover, the overall shaping of the refractive optical element for transforming the source-side light intensity distribution into the desired light intensity distribution provides a further degree of freedom for conditioning the output light intensity distribution in addition to the provision of the at least one chamfer surface. In this way, the conditioning may extend beyond the chamfer portion.

Moreover, with the conditioning of the emitted light intensity distribution via the refractive optical element, the emitted light intensity distribution, i.e. the desired light intensity distribution in the language of the present application, can be adapted to barely satisfy the given requirements. In other words, the emitted light intensity distribution may satisfy, but not or only just exceed the given requirements. This means that the light from the light source is refracted in such a way that it exits the LED light unit right where it is needed for satisfying the given requirements. This in turn means that the light capacity of the LED/LED's in the LED light unit is efficiently used. In this way, it is possible to use less powerful and therefore less costly LED's. It is also possible to reduce the number of LED's, in some application scenarios to exactly one LED.

The orientation of the first and second cross-sectional planes may be defined with respect to the support portion, which may be substantially planar. In particular, the first and second cross-sectional planes may be orthogonal to the substantially planar support portion. In the alternative, the orientation of the first and second cross-sectional planes may be defined with respect to the passenger transport vehicle or with respect to the floor, on which the passenger transport vehicle stands. For example, the first cross-sectional plane may be a vertical plane, while the second cross-sectional plane may be parallel to the floor, i.e. it may be a horizontal plane.

The term source-side light intensity distribution refers to the light intensity distribution emitted by the light source in the absence of further optical structures, in particular in the absence of the refractive optical element. The source-side light intensity distribution is present on the source side of the refractive optical element, i.e. on the inside of the refractive optical element.

The term transforming of the light intensity distribution refers to an alteration of the light intensity distribution merely through refraction at the inner and outer surfaces of the refractive optical element, with the exception of reflection and/or absorption of light at the boundary surface between the refractive optical element and the support portion.

In general, the first and second cross-sectional planes cut through the light source. However, this is not necessary.

According to a further embodiment, the first desired cross-sectional light intensity distribution and/or the second desired cross-sectional light intensity distribution is an envelope curve enveloping a plurality of required light intensity values. In other words, the first desired cross-sectional light intensity distribution may be an envelope curve or the second desired cross-sectional light intensity distribution may be an envelope curve or both may be envelope curves. The plurality of required light intensity values may be represented by discrete point values or by a step function or in any other suitable way. The plurality of required light intensity values may be the same or different for the first and second cross-sectional planes.

By providing an envelope curve, a continuous desired light intensity distribution is achieved. Such a continuous desired light intensity distribution results in a continuous shape of the inner and outer surfaces of the refractive optical element. This in turn allows for an easier and more accurate production as compared to non-continuous surface shapes, in particular when the refractive optical element is injection-molded.

Required light intensity values are generally defined in terms of intensity values for particular angles. In this context, the angles are measured with respect to the principal light emission direction, as explained above.

In more general terms, the first desired cross-sectional light intensity distribution and/or the second desired cross-sectional light intensity distribution may be continuous light intensity distributions.

According to a further embodiment, the first desired cross-sectional light intensity distribution is at least as high as a first required light intensity distribution, the first required light intensity distribution defining minimum light intensity values for at least a part of the first cross-sectional plane. In this way, the first desired cross-sectional light intensity distribution has higher or equal values, as compared to the first required light intensity distribution, across the whole angular range in question, which may be a part or all of the angular range. Accordingly, if the first required light intensity distribution specifies minimum values, it is ensured that those minimum values are respected across the whole applicable angular range.

However, it is also possible that the first required light intensity distribution specifies allowable maximum light intensity values in the first cross-sectional plane or that the first required light intensity distribution specifies a mix of minimum and maximum light intensity values or that the first required light intensity distribution specifies an allowable corridor of light intensity values over the applicable angular range. In each of these cases, the first desired cross-sectional light intensity distribution takes the given light intensity requirements into account and satisfies these requirements. In this way, the alteration of the light intensity distribution via the refractive optical element leads to a desired light intensity distribution on its outside that conforms with the requirements.

According to a further embodiment, the second desired cross-sectional light intensity distribution is at least as high as a second required light intensity distribution, the second required light intensity distribution defining minimum light intensity values for at least a part of the second cross-sectional plane. The second required light intensity distribution defining minimum light intensity values may be present in addition/as an alternative to the first required light intensity distribution. All considerations given above with respect to the first required light intensity distribution equally apply to the second required light intensity distribution. Moreover, all given options for both of these requirements may be combined freely. For example, one of the first and second required light intensity distributions may specify minimum values, while the other of the two may specify maximum values. Any other combination is possible as well.

According to a further embodiment, the inner surface of the refractive optical element has a circular shape in the first cross-sectional plane, with the outer surface of the refractive optical element being shaped in the first cross-sectional plane such that the inner surface and the outer surface transform the source-side light intensity distribution in the first cross-sectional plane into the first desired cross-sectional light intensity distribution. For a light source that emits light radially outwards, a spherical surface does not change the light intensity distribution, as all light rays hit the spherical surface at an angle of 90°. Accordingly, the outer surface alone performs the transformation of the source-side light intensity distribution into the first desired cross-sectional light intensity distribution. This concentration of the transformation on the outer surface makes the determination of the shape of the outer surface in the first cross-sectional plane easier than in the case where both surfaces contribute to the transformation. Accordingly, this allows for a less complex design and production process.

According to a further embodiment, the outer surface of the refractive optical element has a circular shape in the second cross-sectional plane, with the inner surface of the refractive optical element being shaped in the second cross-sectional plane such that the inner surface and the outer surface transform the source-side light intensity distribution in the second cross-sectional plane into the second desired cross-sectional light intensity distribution. Both surfaces contribute to the transformation of the source-side light intensity distribution into the second desired cross-sectional light intensity distribution. With the outer surface having a circular cross-section, it is well-behaved and easy to handle. While contributing to the transformation, it still allows for a manageable design and production process of the inner surface and the refractive optical element as a whole.

According to a further embodiment, both the inner surface and the outer surface of the refractive optical element are not spherical. This does not exclude that both of these surfaces may have circular shapes in particular cross-sections. In a particular embodiment, the inner surface has a circular shape in the first cross-sectional plane and a non-circular shape in the second cross-sectional plane, while the outer surface has a circular shape in the second cross-sectional plane and a non-circular shape in the first cross-sectional plane. As described above, the combination of the respective circular and non-circular surfaces perform the desired transformation of the light intensity distribution in the respective cross-sectional planes. By combining circular and non-circular cross-sections in the described manner, a refractive optical element with low thickness variation may be provided. Such low thickness variation allows for an accurate and comparably easy production of the refractive optical element, especially when it is injection-molded.

According to a further embodiment, the thickest portion of the refractive optical element is less than 3 times as thick as the thinnest portion of the refractive optical element. Such a maximum thickness variation of 3 allows in particular for an accurate and comparably easy production of the refractive optical element, especially when it is injection-molded.

It is pointed out that it is also possible that one of the inner surface and the outer surface is entirely spherical, with the other of the inner and outer surfaces having a shape that ensures the transformation of the source-side light intensity distribution into the desired light intensity distribution. In this case, said other of the inner and outer surfaces comprises the at least one chamfer surface.

According to a further embodiment, the first cross-sectional plane is perpendicular to the second cross-sectional plane. In this way, the light intensity value requirements affect a large portion of the light emitting region of the LED light unit. A widespread conditioning of the light intensity, emitted from the LED light unit, is achieved with the provision of only two cross-sectional light intensity distributions.

According to a further embodiment, the first cross-sectional plane is a vertical cross-sectional plane and the second cross-sectional plane is a horizontal cross-sectional plane. In particular, the definitions of vertical and horizontal may apply to the orientation of the first and second cross-sectional planes with respect to the floor on which the passenger transport vehicle stands. In other words, the terms horizontal and vertical may have the underlying assumption that the LED light unit is placed on a substantially vertical wall portion of the passenger transport vehicle. Accordingly, the vertical and horizontal cross-sectional planes may not be vertical and horizontal, when the LED light unit is provided by itself. In particular, this use of the terms horizontal and vertical is different from the use of the terms height and lower portion, as used above for describing the position of the chamfer portion.

According to a further embodiment, the inner surface and the outer surface of the refractive optical element are continuous surfaces. In particular, the inner surface and the outer surface may be surfaces enveloping the cross sections of the inner and outer surface of the refractive optical element in the first and second cross-sectional planes. In other words, the contours of the refractive optical element in the first and second cross-sectional planes, resulting from the desired cross-sectional light intensity distributions in these planes, are part of the continuous inner and outer surfaces of the refractive optical elements. In particular, the inner and outer surfaces of the refractive optical element may be continuous and differentiable between the first and second cross-sectional planes. They may be smooth and without sharp contours. In this way, the inner surface and the outer surface may be suitably produced by various manufacturing methods, in particular by injection-molding.

It is also possible that the inner surface and the outer surface of the refractive optical element are not shaped over much or all of their extension such that they jointly transform the source-side light intensity distribution into the desired light intensity distribution, as described in various embodiments in the preceding paragraphs. In particular, it is possible that the refractive optical element has a constant thickness with the exception of the chamfer portion. The chamfer surfaces are by definition inclined with respect to the remainder of the refractive optical element and therefore generally lead to a thickness variation in the chamfer portion.

The refractive optical element may have a wide variety of shapes. According to a particular embodiment, the refractive optical element is generally spherical. According to another particular embodiment, the refractive optical element is generally cuboid or box-shaped. It is in general a convex structure having a hollow space to the inside, i.e. towards the light source. The terminology "generally spherical" and "generally cuboid or box-shaped" reflects the fact that the refractive optical element is not entirely spherical or entirely box-shaped due to the presence of the at least one chamfer surface. The terminology "generally spherical" and "generally cuboid or box-shaped" refers to the high level impression of the refractive optical element at first glance.

According to a further embodiment, the refractive optical element extends over a solid angle of $2\pi$. In other words, the refractive optical element extends over half of the total solid angle of $4\pi$, the total solid angle of $4\pi$ denoting the entirety of all directions in 3 dimensions. In yet other words, the refractive optical element fully encloses the light source, when placed on a plane support portion. It is however pointed out that the refractive optical element may also extend over a solid angle of less or more than $2\pi$.

According to a further embodiment, the diameter of the refractive optical element at the support portion is between 10 and 30 mm, in particular between 10 and 20 mm. The diameter denotes the largest extension of the refractive optical element at the support portion, irrespective of the shape of the refractive optical element. The shape and size of the refractive optical element may depend on the number and positioning of the one ore more LED's of the light source. In general, the described embodiments allow for the provision of an extremely compact LED light unit for given light intensity requirements.

It is pointed out that different materials with different refractive indices may be used for the refractive optical element. It is apparent that the refractive index plays an important role in defining the shape of the refractive optical element and the inclination angles of the at least one chamfer surface. Exemplary materials of the refractive optical elements are Polycarbonate and Poly(methyl methacrylate), also referred to as PMMA. The refractive indices of these materials are around 1.5, in particular between 1.45 and 1.6.

According to a further embodiment, the light source is one single LED. In particular, the one single LED may be arranged in the center of the refractive optical element. A single LED has a light intensity distribution that is well-behaved and can be handled in a particularly good way. Therefore, a single LED leads to less complex of a geometry for the refractive optical element in general and for the at least one chamfer surface in particular. It is pointed out that it is also possible that the light source comprises a plurality of LED's, in particular in a chain arrangement.

In general, it is pointed out that the total light intensity of the light source has to be sufficient for satisfying the total required light intensity. The refractive optical element cannot increase the total light intensity. It is not an active element. It can only redirect the emitted light in a particularly advantageous way such that the total light intensity of the light source is used with great efficiency for the purpose of satisfying the light intensity requirements. Consequently, the number and kind of LED's used for the light source depends partly on the given requirements.

According to a further embodiment, a space between the light source and the refractive optical element is free of shutters and reflectors. This allows for an efficient use of the total light intensity of the light source and for the minimization of optical components. The LED light unit may be more energy-efficient and less costly to produce.

According to a further embodiment, the power consumption of the LED light unit is between 1 W and 10 W, in particular between 2 W and 5 W, and more in particular around 3 W.

Exemplary embodiments of the inventions further include a passenger transport vehicle, such as an aircraft, a road vehicle, a ship or a rail car, having at least one LED light unit, as described in any of the embodiments above, the at least one LED light unit being an exterior light of the passenger transport vehicle, i.e. being positioned in the exterior of the passenger transport vehicle. The LED light unit may be attached to the outer surface or outer wall or shell structure of the passenger transport vehicle. The aircraft may be an air plane or a helicopter. The road vehicle may be a bus, a truck or a car. The LED light unit may in particular be a rear navigation light unit of an air plane. Above modifications and advantages equally relate to the passenger transport vehicle.

Exemplary embodiments of the invention further include a method of replacing a used light unit, in particular in a passenger transport vehicle, such as an aircraft, a road vehicle, a ship or a rail car, with an LED light unit, as described in any of the embodiments above, the method comprising the steps of disconnecting the used light unit from a power source, and connecting the LED light unit, as described in any of the embodiments above, to the power source. In this way, new improved LED light units can be included into existing passenger transport vehicles.

BRIEF DESCRIPTION OF THE DRAWINGS

Embodiments of the invention are described in greater detail below with reference to the figures, wherein.

DETAILED DESCRIPTION

Figure 1A:
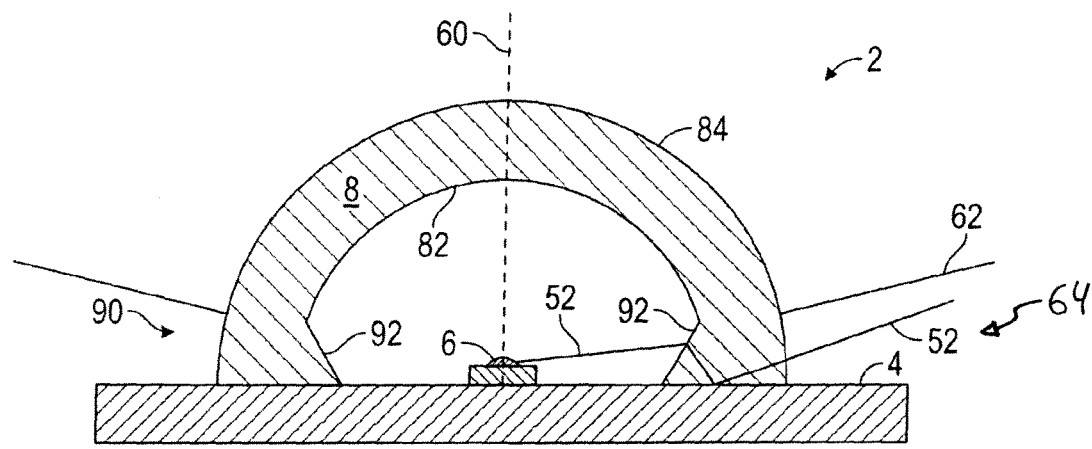
FIGS. 1a to 1d show cross-sectional views through exemplary LED light units in accordance with the invention.

All of the FIGS. 1a to 1d show exemplary LED light units, generally designated by reference numeral 2. The LED light unit 2 comprises a support portion 4, a light source 6, and a refractive optical element 8. In the exemplary embodiments of FIG. 1, the light source 6 is a single LED. However, it is also possible to provide a plurality of LED's as the light source 6, in particular in a chain arrangement.

The refractive optical element 8 has a generally spherical shape. It has an inner surface 82 and an outer surface 84, which form substantially a half of a hollow sphere.

The refractive optical element 8 further has a chamfer portion 90, which comprises a chamfer surface 92. The chamfer surface 92 is an inwards slanted chamfer surface on the inner surface 82 of the refractive optical element 8. The chamfer surface 92 is referred to as an inwards slanted chamfer surface, because it is disposed further inwards than the inner surface 82 would be if the refractive optical element 8 were a perfectly shaped hollow sphere half. In this context, it is pointed out that the refractive optical element 8 is referred to as "generally spherical", because it has the shape of a partial hollow sphere with the exception of the chamfer portion 90, in particular with the exception of the provision of the chamfer surface 92.

In the viewing direction of FIG. 1, the refractive optical element 8 is shown to be placed on top of the support portion 4. Accordingly, reference will be made in the following to a lower portion and an upper portion of the refractive optical element 8. However, it is pointed out that this nomenclature does not require the support portion to be below the refractive optical element 8 in operation. For example, the LED light unit 2 may be attached to a vertical mounting structure, such as an outside wall of an air plane or the like. In that case, the refractive optical element 8 comes to lie laterally from the support portion 4.

FIG. 1 further shows a principal light emission direction 60 and a borderline 62 between an ambient light emission direction 64 and a non-ambient light emission direction. The ambient light emission direction 64 is below the borderline 62 in the orientation of FIG. 1.

The principal light emission direction 60 is orthogonal to the support portion 4 and extends through the center of the LED 6. It is referred to as principal light emission direction, because conventional LED's have their highest light intensity in a direction of emission orthogonal to their positioning on a support structure. However, it is pointed out that the term principal light emission direction herein generally refers to a direction orthogonal to the support portion 4 and extending through the light source 6, in particular through the center of the light source.

The direction of the borderline 62 encloses an angle of 70° with the principal light emission direction 60, seen from the center of the LED 6. Accordingly, the ambient light emission direction encompasses all emission directions that have an angle of 70° and more with respect to the principal light emission direction 60. Due to the support portion 4 being a plane to which the LED 6 is attached, the ambient light emission direction encompasses all directions that have an angle of between 70° and 90° with the principal light emission direction 60.

It can be seen that the chamfer surface 92 is provided in a portion of the refractive optical element 8 that also has an angle of more than 70° with respect to the principal light emission direction 60. The chamfer portion 90, which is the portion of the refractive optical element 8 that comprises the chamfer surface 92, also extends in a portion of the refractive optical element 8 that has an angle of more than 70° with respect to the principal light emission direction 60. In terms of the height of the refractive optical element 8, the chamfer portion extends within ca. 32% of the height of the refractive optical element, in particular in the lower portion thereof. The lower portion is also referred to as the portion adjacent to the support portion 4. It is apparent that the term height refers to the orientation of the LED light unit 2 as given in FIG. 1. If the LED light unit 2 is oriented differently, such as for example during use on the exterior of a passenger transport vehicle, the "height" in the sense of this application may not be a vertical direction.

The chamfer surface 92 is shown as two lines in the cross section of FIG. 1*a*, one to the right and one to the left of the LED 6. These two lines indicate a chamfer surface that extends around the entire perimeter of the generally spherical refractive optical element 8. In this way, the chamfer surface 92 is in the form of a section of a cone. Since the upper end of the chamfer surface 92 is further removed from the principal light emission direction 60 than the lower end of the chamfer surface 92, the chamfer surface 92 is referred to as an inward slanted chamfer surface.

The effect of the chamfer surface 92 in operation will be described as follows. In particular, reference is made to an exemplary light ray 52, whose path from the LED 6 to the refractive optical element and therethrough is shown. It is pointed out that the path of the light ray 52 is not too scale and the refraction somewhat exaggerated for illustration purposes. The light ray 52 extends from the LED 6 to the chamfer surface 92 in a straight line. At the chamfer surface 92, it is refracted towards the support portion 4, which it hits at a border surface between the support portion 4 and the refractive optical element 8. The light ray 52 is reflected at this border surface between the support portion 4 and the refractive optical element 8, from where it travels to the outer surface 84 of the refractive optical element 8, where it is slightly refracted again.

As can be seen, the output direction of the light ray 52 is more towards the principal light emission direction than the initial portion of the light ray 52, as emitted from the LED 6. In other words, the output direction of the light ray 52 encloses a smaller angle with the principal light emission direction 60 than the original emission direction from the LED 6. In particular, the outside emission direction of the light ray 52 has an angle with the principal light emission direction 60 that is reduced in so much as compared to the original emission direction that this light ray does not contribute to the ambient light emission. This can also be seen from the fact that the light ray 52 will cross the borderline 62 to the outside of the refracted optical element 8. In this way, light rays that initially fall into the ambient light emission direction are redirected in such a way that they ultimately end up outside of the ambient light emission direction.

It is also possible that the support portion 4 is light absorbent. In that case, the light ray 52 hits the absorbent surface of the support portion 4 at the border surface between the refractive optical element 8 and the support portion 4. The light ray 52 would end at this border surface and would also not contribute to light emitted in the ambient light emission direction.

Figure 1B:
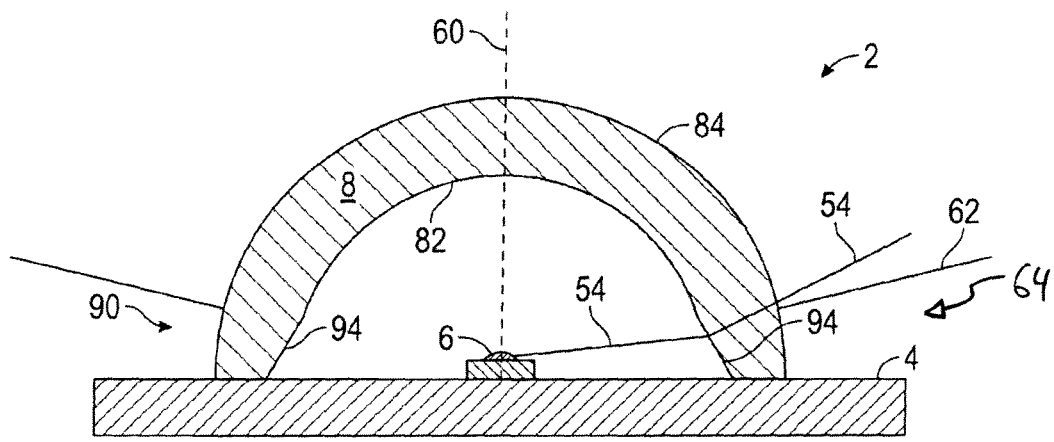

The LED light unit 2 of FIG. 1*b* is an alteration as compared to the LED light unit 2 of FIG. 1*a*. Like elements are denoted with like reference numerals. In particular, the support portion 4 and the LED 6 are the same in FIG. 1*b* as compared to FIG. 1*a*. Also, the refractive optical element 8 of FIG. 1*b* is the same as compared to the refractive optical element of FIG. 1*a*, with the exception of the chamfer portion 90. Therein, the inwards slanted chamfer surface 92 of FIG. 1*a* is replaced with an outwards slanted chamfer surface 94. The outwards slanted chamfer surface 94 is also provided on the inner surface 82 of the refractive optical element 8.

The chamfer surface 94 is referred to as outwards slanted, because the upper end of the chamfer surface 94 is closer to the principal light emission direction 60 than the lower end of the chamfer surface 94. It is also referred to as outwards slanted, because it is further removed from the principal light emission direction than a perfectly spherical inner surface of the refractive optical element would be in that part. Again, the chamfer surface 94 is depicted with two straight lines in the cross sectional view of FIG. 1*b*. With the refractive optical element 8 having a generally spherical structure, the chamfer surface 94 extends around the entire perimeter of the inner surface 82 of the refractive optical element 8, having the shape of a section of a cone.

The effect of the chamfer surface 94 in operation is described as follows. An exemplary light ray 54 is depicted, whose path is not too scale and whose refraction is somewhat exaggerated for illustrative purposes. The light ray 54 extends from the LED 6 to the chamfer surface 94 in a straight line. It is refracted at the chamfer surface 94 in such a way that its path is bent away from the support portion 4. The light ray 54 then travels to the outer surface 84 where it is again slightly refracted. The overall refraction of the light ray 54 has the effect that the output emission direction is not within the ambient light emission direction. In other words, the emission direction of the light ray 54 is altered in such a way as compared to the initial emission direction that the angle between the emission direction and the principal light emission direction 60 is decreased. Consequently, the light ray 54 does not contribute to the light emitted in the ambient light emission direction.

Figure 1C:
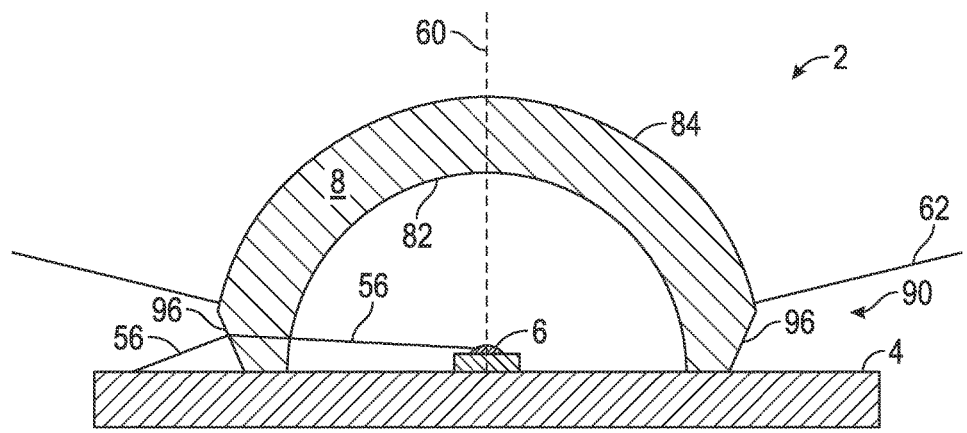

The LED light unit 2 of FIG. 1*c* is an alteration as compared to the LED light unit 2 of FIG. 1*a*. Like elements are denoted with like reference numerals. In particular, the support portion 4 and the LED 6 are the same in FIG. 1*c* as compared to FIG. 1*a*. Also, the refractive optical element 8 of FIG. 1 *c* is the same as compared to the refractive optical element of FIG. 1*a*, with the exception of the chamfer portion 90. Therein, the inwards slanted chamfer surface 92 on the inner surface 82 of FIG. 1a is replaced with an inwards slanted chamfer surface 96 on the outer surface 84 of the refractive optical element 8.

The chamfer surface 96 is referred to as inwards slanted for the same reasons as the chamfer surface 92, discussed above. Again, the chamfer surface 96 is depicted with two straight lines in the cross sectional view of FIG. 1c. With the refractive optical element 8 having a generally spherical structure, the chamfer surface 96 extends around the entire perimeter of the outer surface 84 of the refractive optical element 8, having the shape of a section of a cone.

The effect of the chamfer surface 96 in operation is described as follows. An exemplary light ray 56 is depicted, whose path is not too scale and whose refraction is somewhat exaggerated for illustrative purposes. The light ray 56 extends from the LED 6 to the inner surface 82 in a straight line. It is not refracted at the inner surface 82, because it hits the inner surface 82 at a right angle. Accordingly, the light ray 56 keeps travelling straight to the outer surface 84 where it hits the chamfer surface 96. The chamfer surface 96 has such an inclination that the light ray 56 is refracted towards the support portion 4 and hits the support portion 4 shortly after leaving the refractive optical element 8. The support portion 4 is absorbent, such that the light ray 56 ends at the support portion 4. Overall, the refraction of the light ray 56 has the effect that the light is absorbed by the support portion. Consequently, the light ray 56 does not contribute to the light emitted in the ambient light emission direction.

Figure 1D:
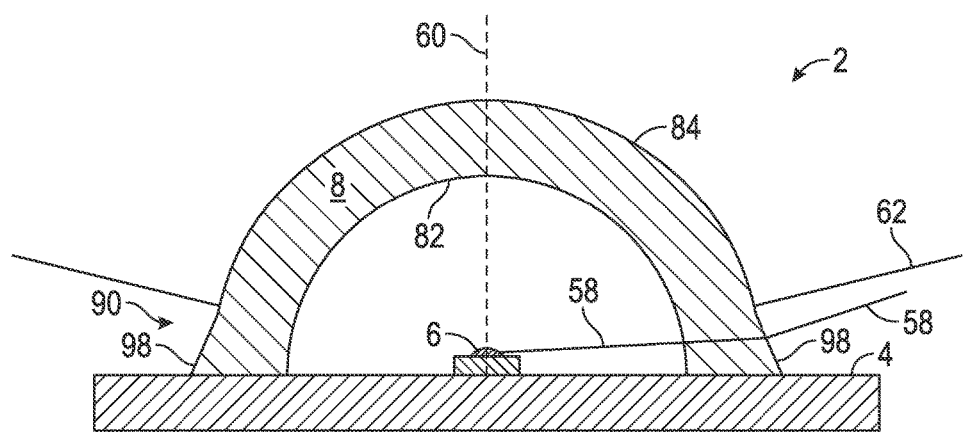

The LED light unit 2 of FIG. 1d is an alteration as compared to the LED light unit 2 of FIG. 1a. Like elements are denoted with like reference numerals. In particular, the support portion 4 and the LED 6 are the same in FIG. 1d as compared to FIG. 1a. Also, the refractive optical element 8 of FIG. 1d is the same as compared to the refractive optical element of FIG. 1a, with the exception of the chamfer portion 90. Therein, the inwards slanted chamfer surface 92 on the inner surface 82 of FIG. 1a is replaced with an outwards slanted chamfer surface 98 on the outer surface 84 of the refractive optical element 8.

The chamfer surface 98 is referred to as outwards slanted for the same reasons as the chamfer surface 94, discussed above. Again, the chamfer surface 98 is depicted with two straight lines in the cross sectional view of FIG. 1d. With the refractive optical element 8 having a generally spherical structure, the chamfer surface 98 extends around the entire perimeter of the outer surface 84 of the refractive optical element 8, having the shape of a section of a cone.

The effect of the chamfer surface 98 in operation is described as follows. An exemplary light ray 58 is depicted, whose path is not too scale and whose refraction is somewhat exaggerated for illustrative purposes. The light ray 58 extends from the LED 6 to the inner surface 82 in a straight line. It is not refracted at the inner surface 82, because it hits the inner surface 82 at a right angle. Accordingly, the light ray 58 keeps travelling straight to the outer surface 84 where it hits the chamfer surface 98. It is refracted at the chamfer surface 98 in such a way that its path is bent away from the support portion 4. The refraction of the light ray 58 has the effect that the output emission direction is not within the ambient light emission direction. In other words, the emission direction of the light ray 58 is altered in such a way as compared to the initial emission direction that the angle between the emission direction and the principal light emission direction 60 is decreased. Consequently, the light ray 58 does not contribute to the light emitted in the ambient light emission direction (assuming a substantial distance from the LED light unit 2).

Accordingly, all four exemplary embodiments of FIGS. 1a to 1d show chamfer surfaces that keep at least a portion of the light away from the ambient light emission direction that would be present if the refractive optical element were perfectly spherical. In other words, the chamfer surfaces decrease the relative light intensity in the ambient light emission direction as compared to the relative light intensity of the light source in this direction. The inclination angles for the chamfer surfaces 92, 94, 96 and 98 depend on various factors, such as the refractive index of the material of the refractive optical element and the particular nature of the desired output light intensity distribution.

While the four embodiments of FIG. 1 each show exactly one chamfer surface, either disposed on the inner surface or on the outer surface, it is also possible to combine different chamfer surfaces. For example, an inwards slanted chamfer surface on the inner surface and an inwards slanted chamfer surface on the outer surface may jointly lead to a refraction where much light is absorbed by the support portion and does not contribute to the output in the ambient light emission direction. In another example, an outwards slanted chamfer surface on the inner surface and outwards slanted chamfer surface on the outer surface may jointly redirect much light into the non-ambient light emission direction. In yet another example, an inwards slanted chamfer surface on the inner surface may lead to absorption of light at the border surface between refractive optical element and support portion, as discussed above. An additional outwards slanted chamfer surface on the outer surface may then redirect light that is just not absorbed by the support portion into the non-ambient light emission direction.

It is further pointed out that the chamfer surfaces do not have to extend around the entire perimeter of the refractive optical element. In the case of a generally spherical refractive optical element, the chamfer surface does not have to have the shape of a section of a cone. In particular, it is possible that the chamfer surface extends around a portion of the perimeter only. In this case, the chamfer surface conditions the output light intensity distribution only in a portion of all cross sections through the LED light unit. An example for such a case will be discussed below.

Figure 2:
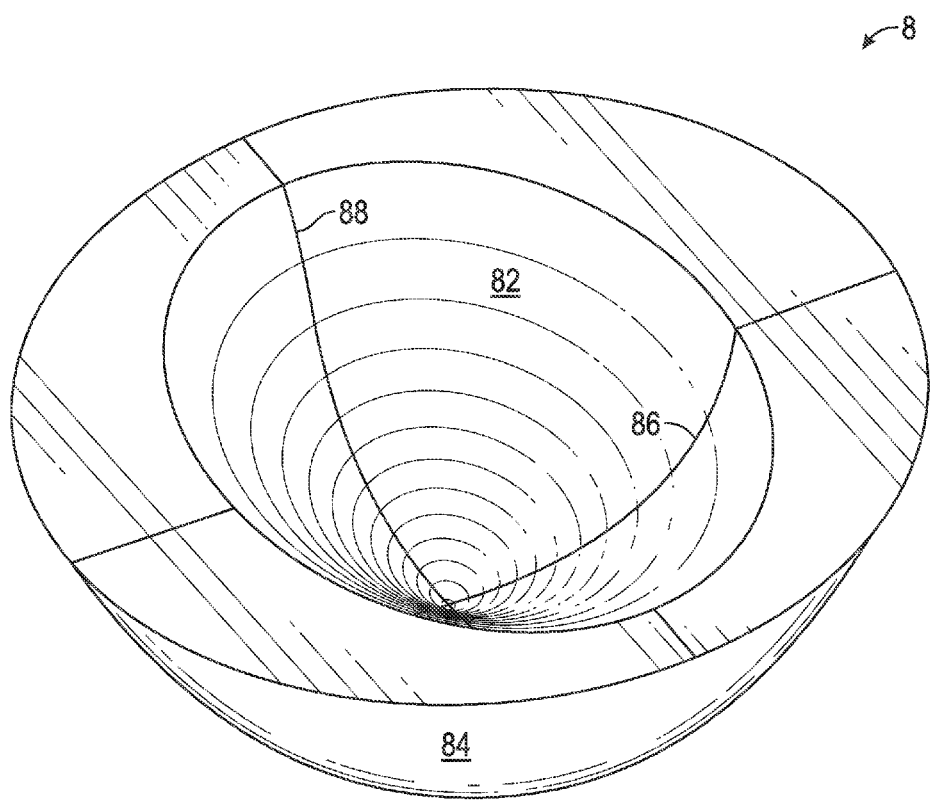
FIG. 2 shows a perspective view of an exemplary refractive optical element in accordance with the invention.

FIG. 2 shows a perspective view of an another exemplary refractive optical element 8 in accordance with the invention. The refractive optical element 8 is shown without a light source and without a support portion. Accordingly, only a part of the LED light unit 2 is shown in FIG. 2.

The refractive optical element has an inner surface 82 and an outer surface 84. The inner surface 82 and the outer surface 84 are both non-spherical. This can be seen from the surfaces themselves and also from the contours on the support-side end of the inner and outer surfaces 82 and 84 (shown on top in the viewing direction of FIG. 2). These end contours of the inner surface 82 and the outer surface 84 are not circular, but elliptical. This shows that both the inner surface 82 and the outer surface 84 are not spherical. By not being spherical, the entirety of the inner surface 82 and the outer surface 84 play a role in conditioning the output light intensity, not only the chamfer surface. This will be explained in more detail below with respect to FIGS. 3-5.

A first cross-sectional plane 86 and a second cross-sectional plane 88 are indicated by lines. The geometry of the inner and outer surfaces 82 and 84 along the first and second cross-sectional planes 86 and 88 will be described in detail with respect to FIG. 3.

FIG. 3 shows an exemplary LED light unit 2 in accordance with the invention in two different cross-sections. The LED light unit 2 has a support portion 4, a light source 6, and the refractive optical element 8. The support portion 4 has a planar surface, to which the light source 6 and the refractive optical element 8 are attached.

The light source 6 is a single LED. The refractive optical element 8, which has the inner surface 82 and the outer surface 84, is arranged over the LED 6. Keeping the perspective view of FIG. 2 in mind, it is apparent that the refractive optical element 8 forms a complete enclosure around the LED 6 on the support portion 4.

Figure 3A:
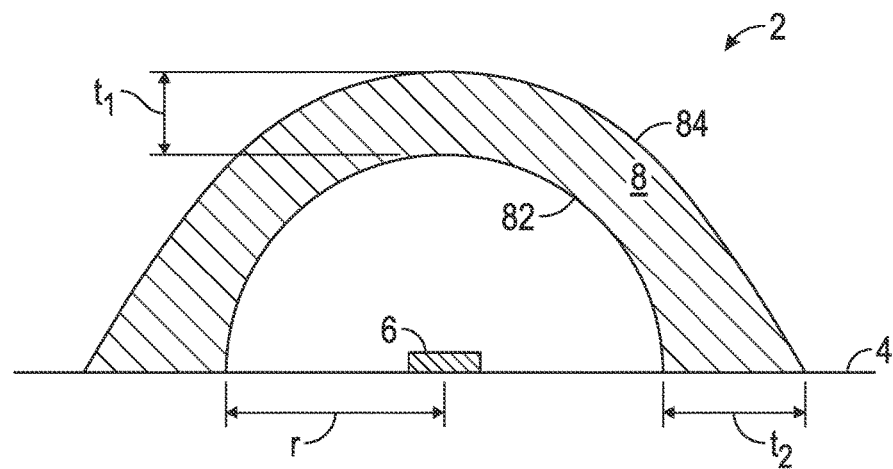
FIGS. 3a and 3b show two cross-sectional views through an exemplary LED light unit in accordance with the invention.

FIG. 3a shows a cross-section through the LED light unit 2 along the first cross-sectional plane 86, referenced in FIG. 2. This cross-section is also referred to as vertical cross-section, because the cross-sectional plane 86 is intended to be a vertical plane, when the LED light unit 2 is in use, i.e. when the LED light unit 2 is mounted to the exterior of a passenger transport vehicle.

The inner surface 82 of the refractive optical element 8 is circular in the vertical cross-section of FIG. 3a. With the single LED 6 emitting light radially, no refraction takes place at the inner surface 82 in this cross-section. The outer surface 84 is non-circular in the vertical cross-section and performs a transformation of the light intensity distribution of the LED 6, i.e. the source-side light intensity distribution, into the first desired cross-sectional light intensity distribution, which will be explained in detail below.

The refractive optical element 8 has a varying thickness in the vertical cross-section. The radius of the circular contour of the inner surface 82 is denoted r. The radius r is between 5 and 6 mm in the exemplary embodiment of FIG. 3. The thickness of the refractive optical element right above the LED 6 ("above" referring to the orientation in the drawing of FIG. 3), i.e. the thickness of the portion of the refractive optical element 8 farthest removed from the support portion 4, is denoted with t1, which is 0.38*r in the exemplary embodiment of FIG. 3. In contrast thereto, the refractive optical element 8 has a thickness t2 right at the support portion 4, which thickness t2 is 0.63*r in the exemplary embodiment of FIG. 3. The contour of the outer surface 84 and the related variation in thickness of the refractive optical element 8 provide for the desired transformation of the light intensity distribution in the first cross-sectional plane, which will be described in more detail below.

Figure 3B:
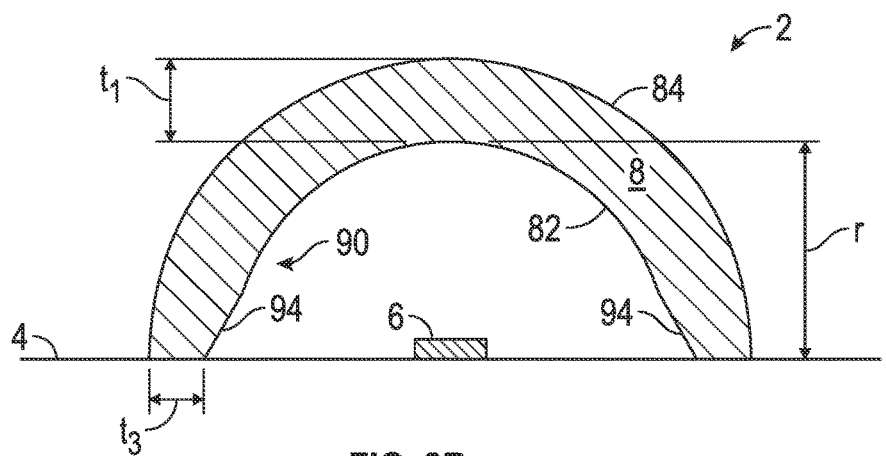

FIG. 3b is another cross-section through the LED light unit 2 along the second cross-sectional plane 88, shown in FIG. 2. This second cross-sectional plane is also referred to as horizontal cross-sectional plane, because this plane is intended to come to lie horizontally when the LED light unit is in use, i.e. when the LED light unit is attached to the passenger support vehicle.

The outer surface 84 is circular in the horizontal cross-section of FIG. 3b. The inner surface 82 is non-circular, such that the light emitted radially from the LED 6 is refracted at the inner surface 82. The refracted light is then again refracted at the outer surface 84. In this way, the inner surface 82 and the outer surface 84 jointly transform the source-side light intensity distribution of the LED 6 into the second desired cross-sectional light intensity distribution, which will be described in greater detail below.

The refractive optical element 8 has a chamfer portion 90. In particular, an outwards slanted chamfer surface 94 is disposed on the inner surface 82 of the refractive optical element 8. This chamfer surface 94 has the effects described above with respect to the chamfer surface 94 of FIG. 1b.

As already described with respect to FIG. 3a, the thickness t1 of the refractive optical element at the portion farthest removed from the support portion 4 is 0.38*r. In the horizontal cross-section, the thickness of the refractive optical element 8 right at the support portion 4, which is denoted t3, is 0.25*r.

When comparing t2 and t3, it can be seen that the thickest portion of the refractive optical element 8 is less than three times as thick as the thinnest portion of the refractive optical element 8. Such a low variation in thickness allows for a comparably easy production of the refractive optical element 8, in particular through injection moulding.

As can be seen from FIG. 2, the refractive optical element 8 has a continuous and differentiable inner and outer surface 82 and 84 between the first and second cross-sectional planes 86 and 88.

Figure 4:
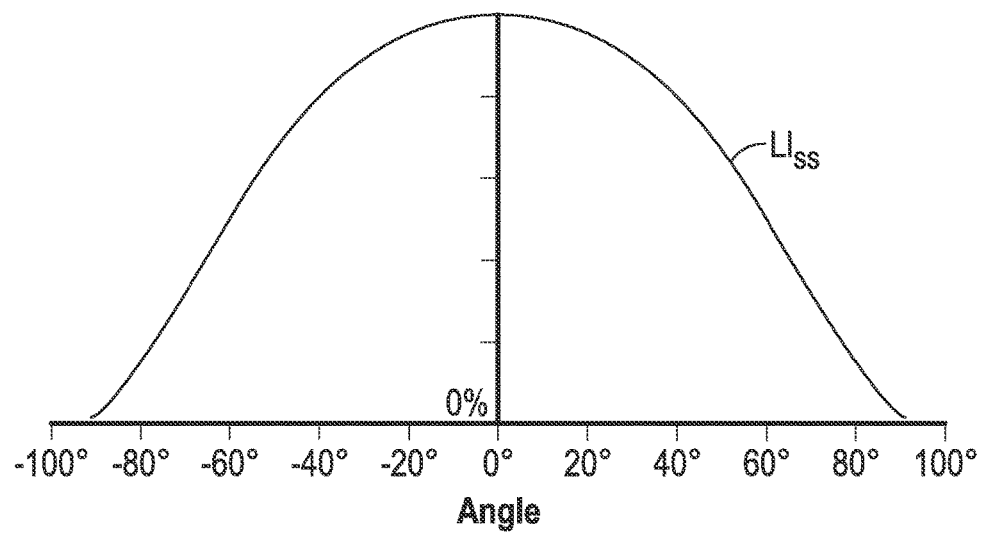
FIG. 4 shows a light intensity distribution of an LED, as used in an exemplary LED light unit in accordance with the invention.

The transformation of the source-side light intensity distribution, i.e. of the emitted light intensity distribution of the LED 6, into the desired light intensity distribution is explained with respect to FIGS. 4 and 5.

FIG. 4 shows the source-side light intensity distribution LISS of the LED 6. This source-side light intensity distribution LISS is the light intensity distribution as emitted by the LED 6. In the exemplary embodiment, it is a typical Lambertian intensity distribution. FIG. 4 represents a radial section cut where the light intensity is shown as a function of an angular value. This angular value is an emitting direction, measured with respect to the principal light emission direction, as explained above. The angle with respect to the principal light emission direction is the angle given on the x-axis of FIG. 4.

As can be seen from FIG. 4, the light intensity of the LED 6 is the greatest in the direction perpendicular to the support portion 4, i.e. in the principal light emission direction. It decreases in emitting directions deviating from that perpendicular direction. The source-side light intensity distribution of FIG. 4 is equally valid for the first cross-sectional plane of FIG. 3a and for the second cross-sectional plane of FIG. 3b.

Figure 5A:
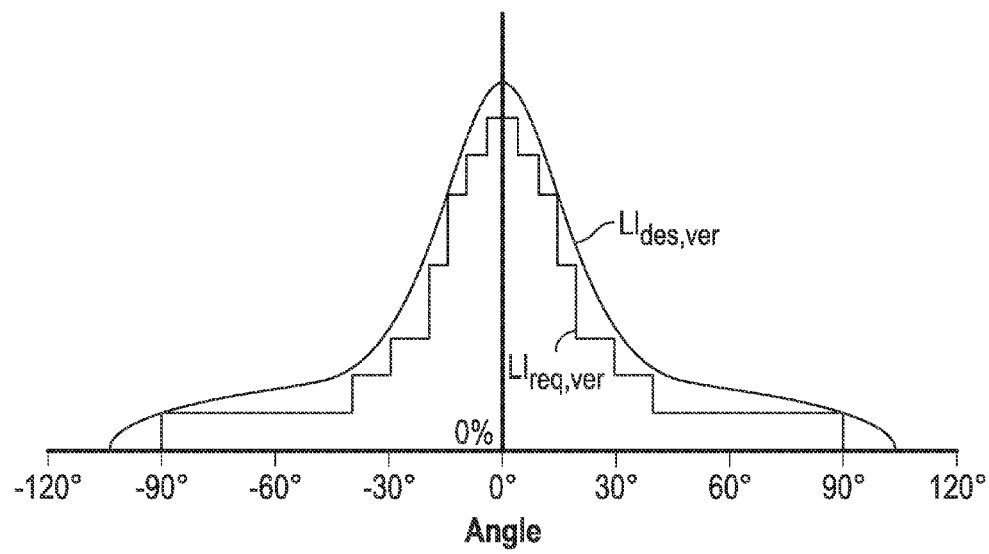
FIGS. 5a and 5b show the respective required light intensity distributions and the respective desired light intensity distributions in two cross-sectional planes in accordance with an exemplary refractive optical element in accordance with the invention.
Figure 5B:
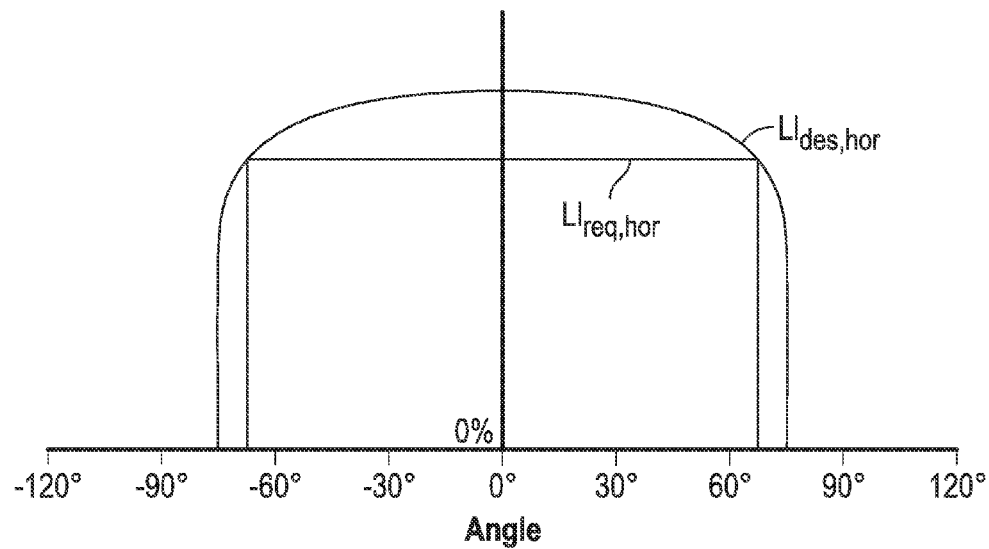

FIGS. 5a and 5b show the light intensity requirements for the vertical and horizontal directions as given by Federal Aviation Regulation (FAR) 25.1385. It is explicitly pointed out that this regulation is an example only. Moreover, these light intensity requirements may not only arise from regulations, but may also arise from other product design considerations in general.

FIG. 5a shows the vertical required light intensity distribution LIreq,ver, as required by above-mentioned Federal Aviation Regulation. The vertical required light intensity distribution LIreq,ver, which is in a more general term referred to as first required light intensity distribution in the present application, is a step function giving required light intensity values for particular angular ranges. The angular scale on the x-axis corresponds to the angular scale of FIG. 4, explained above.

The required vertical light intensity distribution is a set of minimum light intensity values that the LED light unit has to emit in use according to the FAR.

FIG. 5a further shows a desired vertical light intensity distribution LIdes,ver which is in a more general term referred to as first desired cross-sectional light intensity distribution throughout this application. The desired vertical light intensity distribution LIdes,ver envelopes the required vertical light intensity distribution. The envelope curve is above the required vertical light intensity distribution LIReq,ver across the entire angular range. In this way, a continuous light intensity distribution is provided that satisfies all light intensity requirements, but only exceeds those requirements to a very low degree. Therefore, this desired vertical light intensity distribution LIdes,ver satisfies the light intensity requirements with very good efficiency.

Reference is made again to FIG. 3a in connection with FIG. 4 and FIG. 5a. The shape of the outer surface 84 in the vertical cross-section of FIG. 3a has a shape that transforms the source side light intensity distribution LISS of FIG. 4 into the desired vertical light intensity distribution LIdes,ver of FIG. 5a. In other words, the shape of the outer surface 84 is defined as the particular shape that achieves a transformation between exactly those two light intensity distributions.

Analogous considerations apply to the second set of light intensity requirements, given in FIG. 5b. FIG. 5b shows the horizontal required light intensity distribution LIreq,hor, as required by above-mentioned Federal Aviation Regulation. The horizontal required light intensity distribution LIreq,hor, which is in a more general term referred to as second required light intensity distribution in the present application, is a step function giving required light intensity values for particular angular ranges. Again, the angular scale on the x-axis corresponds to the angular scale of FIG. 4, explained above.

The required horizontal light intensity distribution is a set of minimum light intensity values that the LED light unit has to emit in use according to the FAR.

FIG. 5b further shows a desired horizontal light intensity distribution LIdes,hor which is in a more general term referred to as second desired cross-sectional light intensity distribution throughout this application. The desired horizontal light intensity distribution LIdes,hor envelopes the required horizontal light intensity distribution. The envelope curve is above the required horizontal light intensity distribution LIreq,hor. In this way, a continuous light intensity distribution is provided that satisfies all light intensity requirements, but only exceeds those requirements to a very low degree. Therefore, this desired horizontal light intensity distribution LIdes,hor satisfies the light intensity requirements with very good efficiency.

Reference is made again to FIG. 3b in connection with FIG. 4 and FIG. 5b. The shape of the inner surface 82 in the horizontal cross-section of FIG. 2b has a shape that transforms the source side light intensity distribution LISS of FIG. 4 together with the circular outer surface 84 into the desired horizontal light intensity distribution LIdes,hor of FIG. 5b. In other words, the shape of the inner surface 82 is defined as the particular shape that achieves a transformation between exactly those two light intensity distributions in cooperation with the circular outer surface 84.

Particular reference is made to FIG. 5b in combination with FIG. 3b for the effect of the chamfer surface 94. As can be seen from FIG. 5b, the desired horizontal light intensity distribution LIdes,hor is zero for angular values greater than ca. 70°. This is in line with a further requirement of the FAR that the ambient light in the horizontal light emission plane, i.e. the light in emission directions with an angle of more than 70° with respect to the principal light emission direction in the horizontal plane, has to be zero. It is pointed out that this requirement does not exist for all exterior lights, but for some. The chamfer surface 94 is an outwards slanted chamfer surface and thus refracts light away from the support portion 4. In this way, the chamfer surface 94 helps in keeping the light emission direction with angular values of more than 70° in the horizontal plane free from emitted light.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An LED light unit, comprising:
    a support portion,
    a light source having at least one LED, the light source being arranged on the support portion, and
    a refractive optical element having an inner surface and an outer surface, the refractive optical element being attached to the support portion and being arranged over the light source,
    wherein the refractive optical element has a chamfer portion adjacent the support portion, wherein the outer surface of the refractive optical element has an outwards slanted chamfer surface in the chamfer portion in a first cross-sectional plane,
    wherein said outwards slanted chamfer surface forms an angle other than 90° with the support portion in the first cross-sectional plane and wherein said outwards slanted chamfer surface includes a non-differentiable section that is non-differentiable with respect to the remainder of the refractive optical element in the first cross-sectional plane,
    wherein the inner surface of the refractive optical element is circular in the first cross-sectional plane, and
    wherein the LED light unit is an airplane rear navigation light unit having an airplane rear navigation light intensity distribution as defined by Federal Aviation Regulations 25.1391 and 25.1393, as in force on May 7, 2013, and
    wherein the outwards slanted chamfer surface refracts light away from an ambient light emission direction of the airplane rear navigation light intensity distribution in the first cross-sectional plane, wherein the ambient light emission direction is an angular region of between 70° and 90° with respect to a principal light emission direction of the airplane rear navigation light intensity distribution in the first cross-sectional plane.

2. An LED light unit according to claim 1, wherein the at least one chamfer surface extends around the entire perimeter of the refractive optical element.

3. An LED light unit according to claim 1, wherein the chamfer portion extends at most in the lower 50% of the refractive optical element.

4. An LED light unit according to claim 1, wherein the support portion is light-absorbent, at least in a border surface between the refractive optical element and the support portion.

5. An LED light unit according to claim 1, wherein the support portion is reflective, at least in a border surface between the refractive optical element and the support portion.

6. An LED light unit according to claim 1,
    wherein the airplane rear navigation light intensity distribution is defined by at least two cross-sectional light intensity distributions, the at least two cross-sectional light intensity distributions comprising a first desired cross-sectional light intensity distribution in the first cross-sectional plane and a second desired cross-sectional light intensity distribution in a second cross-sectional plane, and wherein the inner surface and the outer surface of the refractive optical element are shaped such that they jointly transform a light output by the light source into the airplane rear navigation light intensity distribution.

7. An LED light unit according to claim 1, wherein the light source is one single LED.

8. An LED light unit according to claim 1, wherein a space between the light source and the refractive optical element is free of shutters and reflectors.

9. An aircraft having at least one LED light unit according to claim 1, the at least one LED light unit being an exterior light of the aircraft.

10. A method of replacing a used light unit in an aircraft with an LED light unit according to claim 1, the method comprising the steps of:

disconnecting the used light from a power source, and
connecting the LED light unit according to claim 1 to the power source.

11. An LED light unit according to claim 1, wherein the chamfer portion extends at most in the lower 40% of the refractive optical element.

\* \* \* \* \*